UNITED STATES PATENT OFFICE.

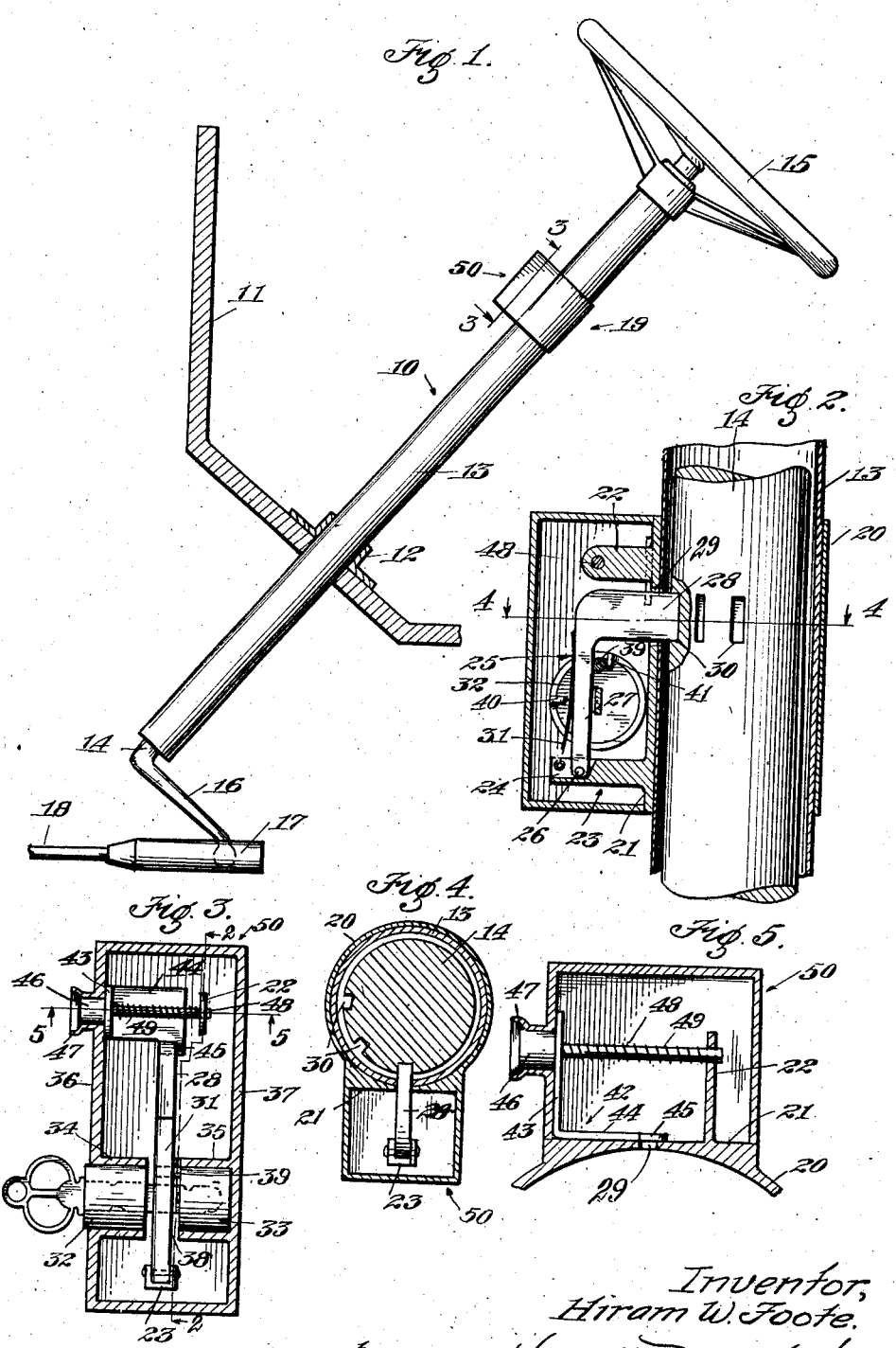

HIRAM W. FOOTE, OF LOS ANGELES, CALIFORNIA.

AUTOMOBILE-STEERING-GEAR LOCK.

1,211,835.  Specification of Letters Patent.  Patented Jan. 9, 1917.

Application filed February 21, 1916. Serial No. 79,542.

*To all whom it may concern:*

Be it known that I, HIRAM W. FOOTE, a citizen of the United States, residing at Los Angeles, in the county of Los Angeles and State of California, have invented new and useful Improvements in Automobile-Steering-Gear Locks, of which the following is a specification.

My invention relates to an automobile steering gear lock.

It is an object of my invention to provide locking means adapted to be mounted at a convenient point upon the steering column of an automobile for engagement with the steering shaft.

Another object is to provide means for locking the steering shaft of an automobile against rotation in various positions so that the front wheels of the automobile may be locked at an angle to the automobile body or in alinement therewith.

Another object is to provide said locking means with a pair of tumbler barrels with contained tumblers, so arranged that they may be operated simultaneously by a single key and will release the steering shaft from engagement with the bolt of the lock, and so that a wide variation of lock combinations may be formed.

Another object is to provide said locking mechanism with a simple and effective bolt guard and releasing device whereby the lock bolt will be prevented from accidentally moving into locking engagement with the steering gear shaft.

It is a further object to provide a shield for said bolt releasing mechanism to prevent the possibility of the bolt releasing device being inadvertently operated and thereby locking the shaft at a time not desired.

It is another object to so form the housing within which said mechanism is mounted that it will be practically impossible for one to gain access thereto or to remove the entire locking device from the steering column.

A further object is to provide a device of the character described which possesses but few working parts which are easily operated and not likely to need repair.

Other objects will appear hereinafter.

The invention is illustrated in the accompanying drawings in which:

Figure 1 is a view in side elevation of the steering gear of an automobile and showing my locking device as applied thereto. Fig. 2 is a view in longitudinal section of my locking mechanism and the steering column adjacent to its mounting as seen on the line 2—2 of Fig. 3 in the direction indicated by the arrows. Fig. 3 is a vertical section taken along the line 3—3 of Fig. 1 and particularly discloses the arrangement of the tumbler barrels with contained tumblers and the bolt releasing mechanism. Fig. 4 is a horizontal section along the line 4—4 of Fig. 2 showing the longitudinal slots adapted to be engaged by the bolt of my locking device and formed in the steering shaft. Fig. 5 is a horizontal section along the line 5—5 of Fig. 3 and discloses the bolt releasing mechanism and its mounting.

More specifically, 10 indicates a steering gear of an automobile as mounted upon the automobile body 11 by means of a mounting bracket 12. The steering gear 10 consists of an outer casing or steering column 13 having a steering shaft 14 rotatably mounted within it and extending the full length thereof. The steering shaft 14 has a steering wheel 15 rigidly secured at its upper end, said wheel being adapted to rotate the shaft. Upon the opposite or lower end of the steering shaft is rigidly mounted a steering arm or bell-crank 16 which is engaged by the socket 17 of a drag-link 18. The drag-link leads to a system of links and levers which connect to the steering knuckles of the vehicle and which knuckles are actuated thereby for guiding the automobile.

My invention primarily resides in a locking mechanism 19 mounted upon the steering column and adapted to lock the steering shaft against rotation. This in turn locks the front wheels of the automobile against movement and in so doing makes it impractical for those maliciously inclined to control the car or drive it away. The locking device 19 embodies an annular sleeve 20 of an inside diameter approximate to that of the outside diameter of the steering column 13. Formed upon one side of said sleeve is a base portion 21 having its outer face in a single plane and extending parallel to the longitudinal axis of the steering column. Formed upon the flat face of said base are two standards 22 and 23. The standard 22 is provided to form a mounting for a bolt releasing mechanism which will be hereafter described. The standard 23 extends at right angles to the base and is slotted at its outer end 24 to form a pivotal mounting for a locking bolt 25 secured within the standard by means of a pivot pin 26. The locking bolt 25 is formed of a longitudinally extending shank 27 having a bolt portion 28 mounted integral with the outer end of said shank and extending at right angles thereto. The bolt 28 is adapted to pass through an opening 29 in the base portion 21 and a similar opening in the steering column and into engagement with one of a series of longitudinally extending parallel depressions or slots 30 formed around the outer periphery of the steering shaft.

I have here shown the slots 30 as three in number and it is intended that they be so arranged that when the bolt is in the central slot the car is locked with its wheels positioned parallel to the car body and that when the bolt is in engagement with either of the other slots the front wheels will be turned and locked at an angle to the right or the left of the car body.

The bolt member 25 normally tends to move toward the surface of the steering column, for which purpose a flat spring 31 is provided, which spring is mounted at one end on the standard 23 and has its opposite end bearing against the back of the bolt shank 27.

To oppose the action of the spring 31 I have provided a key operated actuating means by which the bolt will be raised from engagement with the steering shaft. Said means consists of a system of lock tumbler barrels 32 and 33 with contained tumblers, said tumbler barrels being mounted to rotate within mountings 34 and 35 formed upon the inner faces of the parallel sides 36 and 37 of the lock housing. These tumbler barrels are so arranged in relation to each other that their longitudinal axes are the same and that a space 38 intervenes between their adjacent inwardly projecting ends. The space 38 is of sufficient width to allow the movement of the lock bolt 25 between the two tumbler barrels. This movement is afforded by means of a lug 39 formed upon and extending at right angles to the inner face of tumbler barrel 33. This lug extends beneath the shank of the bolt and when the proper key is inserted through the tumbler barrels and the latter turned the lug will engage and lift the bolt. The movement of the lug 39 is limited by stops 40 and 41 positioned in its path of travel.

It will be seen that the bolt of my locking device may be operated both to rise and fall by means of the tumbler barrels and key hereinbefore described. This, however, is a rather inconvenient operation when the car is left hurriedly as the key will have to be inserted through the tumbler barrels and the bolt relieved. To make it possible for the car to be quickly locked, I have provided a lock bolt releasing mechanism for instantly allowing the bolt portion 28 to fall into engagement with the periphery of the steering shaft. This mechanism consists of an angular member 42 having one of its legs 43 extending alongside the wall 36 of the housing. The opposite leg 44 extends at right angles thereto and bears upon the face of the base portion 21. The portion 44 has formed upon its one edge a bolt obstructing guard 45. The portion 45 constitutes a slide guard and is adapted to normally lie over the opening 29 in the base 21 and in this manner obstructs the path of travel of the bolt portion 28. Movement is afforded the angular member 42 by means of a push button 46 which extends through the wall of the housing and lies within a shield 47 mounted upon the outside of the housing. A pin 48 is secured to the angular member and is slidably mounted within the standard 22. It will thus be seen that when the button is pushed the angular member will move toward the standard 22 and thus carry the guard 45 out of the path of travel of the bolt. A spring 49 acts against the button and tends to draw the member 42 into its position with the guard 45 over the slot 29. By this means the bolt is instantly released without the use of the key and allowed to drop into register with one of the slots 30 upon the steering shaft.

The above mechanism is inclosed within a housing 50 having all of its sides either brazed together or secured by screws, the heads of which are filed off making it impossible for one to gain access to the mechanism without considerable effort. The housing is in turn preferably brazed to the steering column.

The operation of the invention is as follows: Assume the lock to be in its unlocked position, that is with the bolt 28 retracted in opposition to the spring 31 and held in this position by the slide guard 45 which will be positioned between the locking end of the bolt 28 and the opening 29. The tumbler barrel 33 may then be positioned with the pin 39 extending adjacent the stem 27 of the bolt or it may be disposed adjacent the lug 41, according to the position assumed by the tumbler barrel on withdrawal of the key; the tumbler barrel 33 being free to turn within the limit of movement of the pin 39 between the bolt and the lug 41. When it is desired to throw the bolt, the button 46 is depressed to move the slide guard 45 from beneath the bolt, whereupon the spring 31 will project the bolt into engagement with a slot 30 or in contact with the surface of the shaft 14 so that when the latter is turned the bolt will move into engagement with a slot on same being positioned to register with the bolt. The spring 31 will then operate to hold the bolt in its projected locking position, and the tumbler barrel 33 will be disposed with the pin 39 adjacent the stop lug 40, as shown in Fig. 2. The bolt is thus thrown by actuating the push button and without the use of a key, which enables quick locking of the vehicle. To retract the bolt, a key is inserted through the slot in the outer tumbler barrel and introduced into the slot in the inner tumbler barrel, whereupon the key and tumbler barrels are turned to cause the pin 39 to engage the bolt and retract same in opposition to the spring 31. When the bolt has been retracted a sufficient distance to clear the lug 41, the spring 49 will operate to shift the lug and interpose it between the bolt and the slot 29, thus restoring the lock to its unlocked position, where it is securely held against accidental engagement with the shaft by the slide guard. The tumbler barrels may then be turned to their normal position with the pin 39 against the lug 41.

What I claim is:

1. The combination with a steering column having an opening, and a steering shaft turnable within the column formed with a slot arranged to register with the opening in the column, of a lock housing on the column, a guard slidably mounted in the housing arranged to cover the opening in the column, means for normally holding the guard in an advanced position, a pivoted spring-pressed bolt in the housing arranged to seat on the guard, means for retracting the guard from the exterior of the housing to release the bolt and allow it to advance through the opening into engagement with the slot in the shaft, and key controlled means for retracting the bolt.

2. The combination with a steering column having an opening, and a steering shaft turnable within the column formed with a slot arranged to register with the opening in the column, of a lock housing on the column, a guard slidably mounted in the housing arranged to cover the opening in the column, means for normally holding the guard in an advanced position, a pivoted spring-pressed bolt in the housing arranged to seat on the guard, means for retracting the guard from the exterior of the housing to release the bolt and allow it to advance through the opening into engagement with the slot in the shaft, a key controlled tumbler, and a pin on said tumbler positioned in the path of travel of the bolt and adapted, on turning of the tumbler in one direction, to move the bolt to its retracted position.

3. A lock, comprising a housing formed with an opening, a spring-pressed guard slidably mounted in the housing normally projecting over the opening, a pivoted spring-pressed bolt in the housing arranged to normally seat on the guard, means for retracting the guard from the exterior of the housing to release the bolt and allow it to advance through the opening, and key-controlled means for retracting the bolt.

4. A lock, comprising a housing formed with an opening, a spring-pressed guard slidably mounted in the housing normally projecting over the opening, a pivoted spring-pressed bolt in the housing arranged to normally seat on the guard, means for retracting the guard from the exterior of the housing to release the bolt and allow it to advance through the opening, a key-controlled tumbler, and means on said tumbler adapted to engage the bolt when turning the tumbler to move the bolt to its retracted position.

In testimony whereof I have signed my name to this specification.

HIRAM W. FOOTE.